US011146803B2

(12) United States Patent
Su et al.

(10) Patent No.: US 11,146,803 B2
(45) Date of Patent: Oct. 12, 2021

(54) DISTRIBUTION OF MULTI-FORMAT HIGH DYNAMIC RANGE VIDEO USING LAYERED CODING

(71) Applicant: DOLBY LABORATORIES LICENSING CORPORATION, San Francisco, CA (US)

(72) Inventors: Guan-Ming Su, Fremont, CA (US); Samir N. Hulyalkar, Los Gatos, CA (US); Tao Chen, Palo Alto, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 633 days.

(21) Appl. No.: 14/772,051

(22) PCT Filed: Feb. 14, 2014

(86) PCT No.: PCT/US2014/016544
§ 371 (c)(1),
(2) Date: Sep. 1, 2015

(87) PCT Pub. No.: WO2014/163793
PCT Pub. Date: Oct. 9, 2014

(65) Prior Publication Data
US 2016/0014422 A1 Jan. 14, 2016

Related U.S. Application Data

(60) Provisional application No. 61/894,198, filed on Oct. 22, 2013, provisional application No. 61/776,610, filed on Mar. 11, 2013.

(51) Int. Cl.
*H04N 19/33* (2014.01)
*H04N 19/124* (2014.01)
(Continued)

(52) U.S. Cl.
CPC ............... *H04N 19/33* (2014.11); *G06T 3/40* (2013.01); *H04N 19/124* (2014.11);
(Continued)

(58) Field of Classification Search
CPC ........ G06T 3/40; H04N 19/33; H04N 19/124; H04N 19/157; H04N 19/44; H04N 19/593; H04N 19/70
(Continued)

(56) References Cited

U.S. PATENT DOCUMENTS 8,594,191 B2 * 11/2013 Gordon ................. H04N 19/61
375/240.08
8,811,490 B2  8/2014 Su
(Continued)

FOREIGN PATENT DOCUMENTS

EP 1655966 5/2006
EP 2369843 9/2011
(Continued)

OTHER PUBLICATIONS

Ruifeng, X. et al "High-Dynamic-Range Still-Image Encoding in JPEG 2000", IEEE Computer Graphics and Applications, New York, USA, vol. 25, No. 6, Nov. 1, 2005, pp. 57-64.
(Continued)

*Primary Examiner* — Joseph G Ustaris
*Assistant Examiner* — Jimmy S Lee

(57) ABSTRACT

An encoder receives an input enhanced dynamic range (EDR) image to be stored or transmitted using multiple coding formats in a layered representation. A layer decomposer generates a lower dynamic range (LDR) image from the EDR image. One or more base layer (BL) encoders encode the LDR image to generate a main coded BL stream and one or more secondary coded BL streams, where each secondary BL stream is coded in a different coding format (Continued)

than the main coded BL stream. A single enhancement layer (EL) coded stream and related metadata are generated using the main coded BL stream, the LDR image, and the input EDR image. An output coded stream includes the coded EL stream, the metadata, and either the main coded BL stream or one of the secondary coded BL streams. Computation-scalable decoding and display management processes for EDR images are also described.

12 Claims, 8 Drawing Sheets

(51) Int. Cl.
  *H04N 19/157* (2014.01)
  *H04N 19/44* (2014.01)
  *H04N 19/593* (2014.01)
  *H04N 19/70* (2014.01)
  *G06T 3/40* (2006.01)

(52) U.S. Cl.
  CPC .......... *H04N 19/157* (2014.11); *H04N 19/44* (2014.11); *H04N 19/593* (2014.11); *H04N 19/70* (2014.11)

(58) Field of Classification Search
  USPC .................................................. 375/240.03
  See application file for complete search history.

(56) References Cited

U.S. PATENT DOCUMENTS

| | | | | |
|---|---|---|---|---|
| 2005/0117641 A1* | 6/2005 | Xu | ...................... | H04N 21/2662 375/240.08 |
| 2005/0220190 A1* | 10/2005 | Ha | ........................ | H04N 19/53 375/240.16 |
| 2007/0086518 A1* | 4/2007 | Jeon | ...................... | H04N 19/105 375/240.1 |
| 2007/0147493 A1* | 6/2007 | Jeon | ........................ | H04N 19/34 375/240.1 |
| 2009/0141809 A1* | 6/2009 | Visharam | .............. | H04N 19/436 375/240.25 |
| 2009/0259477 A1* | 10/2009 | Ashley | ..................... | G10L 19/24 704/500 |
| 2010/0046612 A1* | 2/2010 | Sun | ........................ | H04N 19/187 375/240.02 |
| 2013/0148029 A1 | 6/2013 | Gish | | |
| 2014/0219338 A1* | 8/2014 | Komiya | ................ | H04N 19/187 375/240.02 |
| 2014/0247869 A1 | 9/2014 | Su | | |

FOREIGN PATENT DOCUMENTS

| | | |
|---|---|---|
| JP | 2007-513565 | 5/2007 |
| JP | 2007-514359 | 5/2007 |
| JP | 2008-527870 | 7/2008 |
| JP | 2009-207114 | 7/2009 |
| JP | 2011-205611 | 10/2011 |
| WO | 2006/008681 | 1/2006 |
| WO | 2009/054920 | 4/2009 |
| WO | 2012/148883 | 11/2012 |
| WO | 2014/130343 | 8/2014 |

OTHER PUBLICATIONS

Garcia, D.C. et al, "Video Compression Complexity Reduction with Adaptive Down-Sampling" IEEE 18th International Conference on Image Processing, Sep. 1, 2011, pp. 745-748.

Lasserre, S. et al "Low Complexity Scalable Extension of HEVC Intra Pictures Based on Content Statistics" JCT-VC Meeting, MPEG 9th Meeting: Geneva, CH Apr. 27-May 7, 2012.

Segall, A. et al "Improved High-Definition Video by Encoding at an Intermediate Resolution" Visual Communications and Image Processing, San Jose, CA, SPIE vol. 5308, Jan. 20, 2004.

* cited by examiner

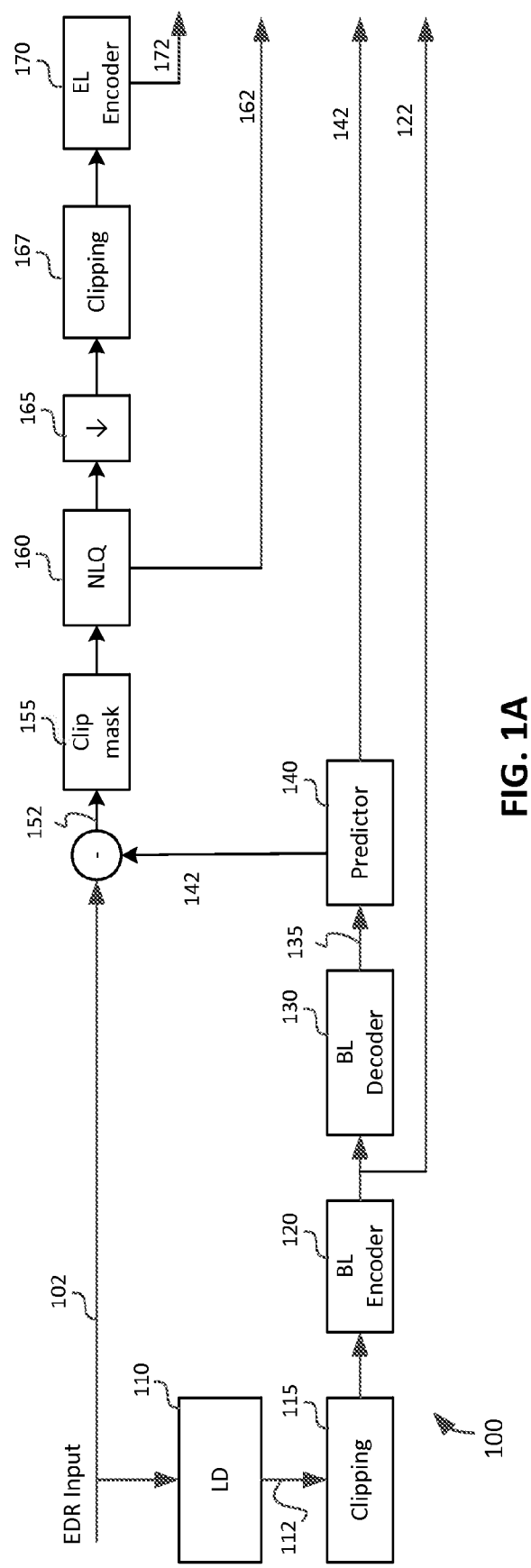
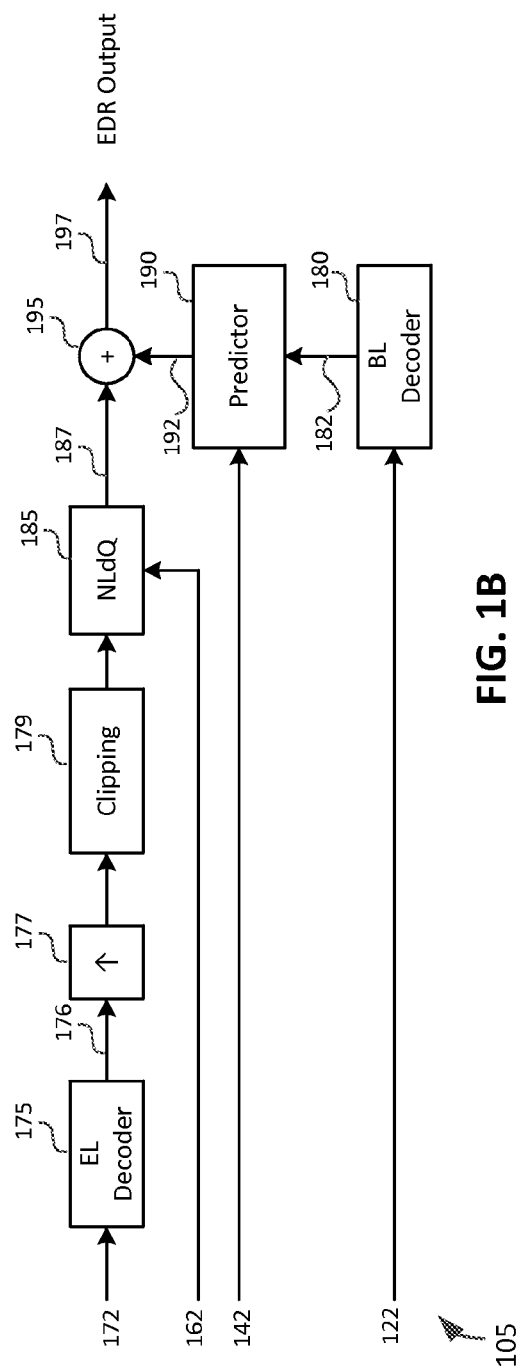
FIG. 1A
FIG. 1B

DISTRIBUTION OF MULTI-FORMAT HIGH DYNAMIC RANGE VIDEO USING LAYERED CODING

CROSS REFERENCE TO RELATED APPLICATIONS

This application claims priority to U.S. Provisional Patent Application No. 61/776,610, filed on Mar. 11, 2013 and U.S. Provisional Patent Application No. 61/894,198, filed on Oct. 22, 2013, each of which is hereby incorporated by reference in its entirety.

TECHNOLOGY

The present invention relates generally to video images. More particularly, an embodiment of the present invention relates to the distribution of multi-format video images with high or enhanced dynamic range using layered coding.

BACKGROUND

As used herein, the term 'dynamic range' (DR) may relate to a capability of the human psychovisual system (HVS) to perceive a range of intensity (e.g., luminance, luma) in an image, e.g., from darkest darks (blacks) to brightest brights (whites). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). For example, well adapted humans with essentially normal (e.g., in one or more of a statistical, biometric or ophthalmological sense) have an intensity range that spans about 15 orders of magnitude. Adapted humans may perceive dim light sources of as few as a mere handful of photons. Yet, these same humans may perceive the near painfully brilliant intensity of the noonday sun in desert, sea or snow (or even glance into the sun, however briefly to prevent damage). This span though is available to 'adapted' humans, e.g., those whose HVS has a time period in which to reset and adjust.

In contrast, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is simultaneously perceivable by a HVS. As used herein, EDR may relate to a DR that spans 5 to 6 orders of magnitude. Thus while perhaps somewhat narrower in relation to true scene referred HDR, EDR nonetheless represents a wide DR breadth.

In practice, images comprise one or more color components (e.g., luma Y and chroma Cb and Cr) wherein each color component is represented by a precision of n-bits per pixel (e.g., n=8). Using linear coding, images where n≤8 (e.g., color 24-bit JPEG images) are considered images of standard dynamic range, while images where n>8 may be considered images of enhanced dynamic range. EDR and HDR images may also be stored and distributed using high-precision (e.g., 16-bit) floating-point formats, such as the OpenEXR file format developed by Industrial Light and Magic.

Most consumer desktop displays support luminance of 200 to 300 cd/m² or nits. Most consumer HDTVs range from 300 to 1000 cd/m². Such conventional displays thus typify a low dynamic range (LDR), also referred to as a standard dynamic range (SDR), in relation to HDR or EDR. As the availability of EDR content grows due to advances in both capture equipment (e.g., cameras) and EDR displays (e.g., the PRM-4200 professional reference monitor from Dolby Laboratories), EDR content may be color graded and displayed on EDR displays that support higher dynamic ranges (e.g., from 1,000 nits to 5,000 nits or more).

Video signals may be characterized by multiple parameters, such as bit-depth, color space, color gamut, and resolution. Modern televisions and video playback devices (e.g., Blu-ray players) support a variety of resolutions, including standard-definition (e.g., 720×480i) and high-definition (HD) (e.g., 1920×1080p). Ultra high-definition (UHD) is a next generation resolution format with at least a 3,840×2,160 resolution (referred to as 4K UHD) and options to go as high as 7680×4320 (referred to as 8K UHD). Ultra high-definition may also be referred to as Ultra HD, UHDTV, or super high-vision. As used herein, UHD denotes any resolution higher than HD resolution.

To support backwards compatibility with legacy playback devices as well as new HDR or UHD display technologies, multiple bitstream layers may be used to deliver UHD and HDR (or EDR) video data from an upstream device to downstream devices. Given such a multi-layer stream, legacy decoders may use one set of layers to reconstruct an HD EDR version of the content. Advanced decoders may use a second set of layers to reconstruct an UHD EDR version of the content to render it on more capable displays. As appreciated by the inventors here, improved techniques for the coding and distribution of multi-format EDR video are desirable.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which:

FIG. 1A, FIG. 1C, and FIG. 1G depict example data flows for layered, multi-format, encoding systems for EDR images according to embodiments of the present invention;

FIG. 1B, and FIG. 1D, FIG. 1E, FIG. 1F, and FIG. 1H depict example data flows for layered, multi-format, decoding systems for EDR images according to embodiments of the present invention;

DESCRIPTION OF EXAMPLE EMBODIMENTS

Figure 1C:
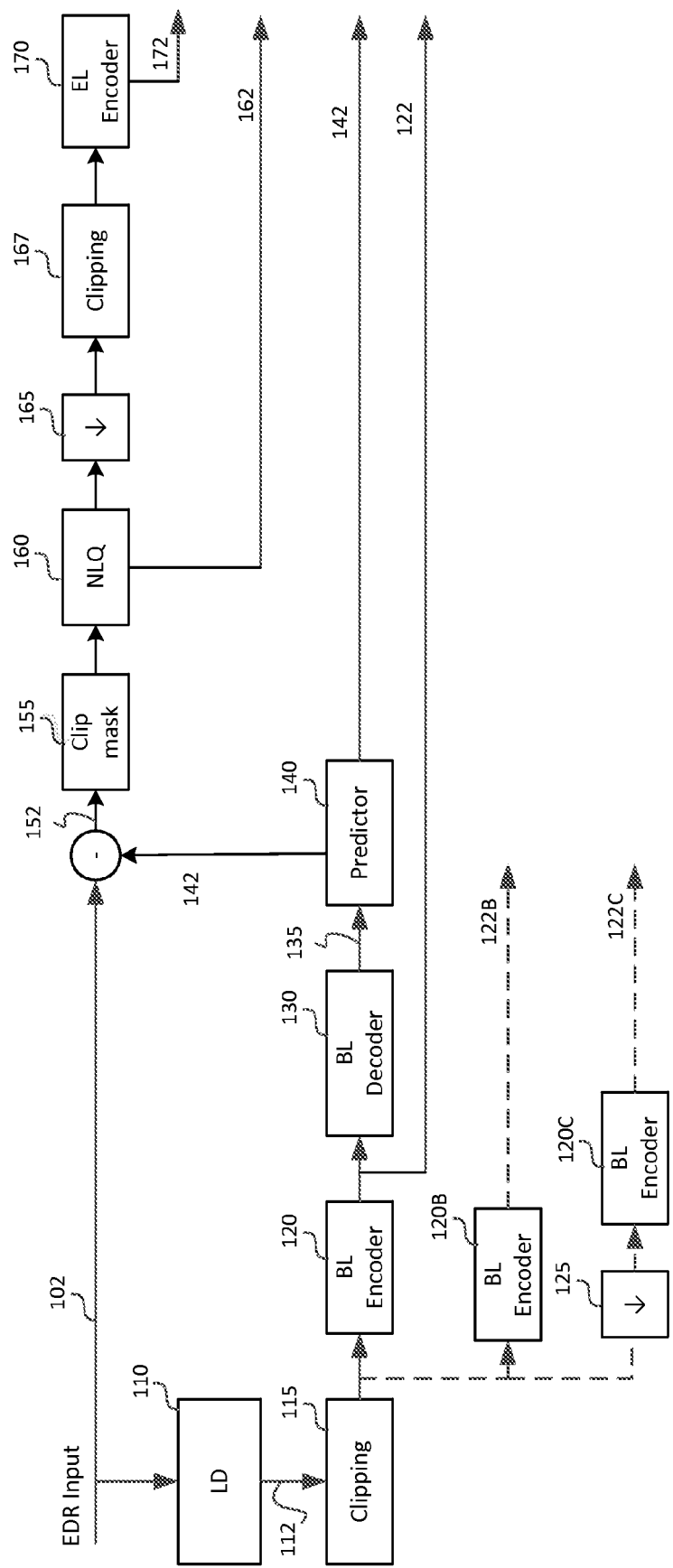

Efficient distribution and computation-scalable decoding of multi-format video images with enhanced dynamic range (EDR) are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to the distribution of multi-format video images with high or enhanced dynamic range. An encoder receives an input enhanced dynamic range (EDR) sequence of images to be stored or transmitted using multiple coding formats in a layered representation. A layer decomposition process uses the input EDR images to generate lower dynamic range (LDR) images. Using one or more base layer (BL) encoders, the encoder encodes the LDR images to generate a main coded BL stream and one or more secondary coded BL streams, wherein each secondary BL stream is coded in a different coding format than the main coded BL stream. A single enhancement layer (EL) coded stream and related metadata are generated using the main coded BL stream, the LDR images, and the input EDR images. An output coded EDR stream includes the coded EL stream, the metadata, and either the main coded BL stream or one of the secondary coded BL streams.

In some embodiments a secondary coded BL stream is coded at a different resolution than the main coded BL stream.

In some embodiments a secondary BL stream is coded at a different bit rate than the main coded BL stream.

In some embodiments a secondary BL stream is coded using a different coding standard than the main coded BL stream.

In some embodiments, a single BL coded stream, a main EL coded stream, and one or more secondary coded EL streams are generated, where each of the secondary coded EL streams are coded using a different coding format than the main coded EL stream. An output coded EDR stream includes the coded BL stream, the metadata used to generate the coded BL stream and the main coded EL stream, and either the main coded EL stream or one of the secondary coded EL streams.

In a decoder, a received coded EDR signal comprises a coded BL stream in a first spatial resolution, a coded EL stream in a second spatial resolution lower than the first spatial resolution, and a prediction function used to predict an EDR image based on the decoded BL stream. A compositor combines the predicted EDR image and a decoded EL image to generate an EDR output image. In one embodiment, a decoded EL image is up-sampled to the first spatial resolution, and compositing is performed with all images at the first spatial resolution. In another embodiment, the decoded BL image is down-sampled to the second spatial resolution and compositing is performed with all images at the second spatial resolution; then the output of the compositor is up-sampled to generate an output EDR image at the first resolution.

An EDR decoder may not have enough compute power to perform display management of an EDR signal at its full spatial resolution. In a computation-scalable decoder, an input EDR image in a first spatial resolution is down-sampled to generate a first down-sampled EDR image of a second spatial resolution lower than the first spatial resolution. The first down-sampled EDR image is up-sampled to generate a second EDR image at the first spatial resolution. A residual image represents differences between pixels of the input EDR image and the second EDR image. A display management process operates on the first down-sampled EDR image to generate a low-resolution DM image. The low-resolution DM image is up-sampled to generate an intermediate DM signal at the first spatial resolution, and the residual image is added to the intermediate DM signal to generate a full-resolution DM signal.

In a reconfigurable EDR decoder, each of a BL Scaler and an EL Scaler may be configured to up-scale, down-scale, or perform no-scaling depending on the spatial resolutions of the encoded signal, the spatial resolutions of the coded BL and EL streams, and the resolution of a target display. The configuration is performed so that no output scaling is required for the decoded EDR signal and scaling operations in the EDR decoder are minimized.

Encoder and Decoder for Multi-Format EDR Signals
Layered Coding and Decoding

Existing display and play-back devices, such as HDTVs, set-top boxes, or Blu-ray players, typically support signals of up to 1080p HD resolution (e.g., 1920×1080 at 60 frames per second). For consumer applications, such signals are now typically compressed using a bit-depth of 8 bits per pixel per color component in a luma-chroma color format where typically the chroma components have a lower resolution than then luma component (e.g., the YCbCr or YUV 4:2:0 color format). Because of the 8-bit depth and the corresponding low dynamic range, such signals are typically referred to as signals with standard dynamic range (SDR).

As new television standards are being developed, such as Ultra High Definition (UHD), it may be desirable to encode signals with enhanced resolution and/or enhanced dynamic range.

FIG. 1 depicts an embodiment of an example implementation of a system supporting coding of UHD signals with enhanced dynamic range (EDR). The encoder comprises a base layer (BL) Encoder (120) and an enhancement layer (EL) encoder (170). In an embodiment, BL Encoder 120 may comprise a new standards-based encoder, such as an HEVC encoder, while the EL Encoder may be a legacy encoder, such as an AVC (or H.264) encoder. However, this system is applicable to any combination of either known or future encoders, whether they are standard-based or proprietary.

In some embodiments, a base layer and one or more enhancement layers may be used, for example by an upstream device (e.g., an EDR image encoder 100 of FIG. 1A), to deliver EDR image data in one or more video signals (or coded bit-streams) to a downstream device (e.g., EDR image decoder 105 of FIG. 1B). The coded image data may comprise base layer image data 112 of a lower bit depth (e.g., 8-bit or 10-bit), quantized from a higher bit depth (e.g., 12 or more bits) EDR Input image 102 and carried in a coded base layer image container 122, and an enhancement layer image data 172 comprising residual values between the EDR image 102 and predicted image data 142 generated from the base layer image data. The base layer image data and the enhancement layer image data may be received and used by the downstream device to reconstruct an EDR output (197) which is a close approximation of the input EDR image (102).

In some embodiments, the coded base layer image data 122 may not be backward compatible to legacy coded SDR formats; instead, the base layer image data, together with the enhancement layer image data, is optimized for reconstructing high quality EDR images for viewing on EDR displays.

FIG. 1A depicts a layered EDR encoder architecture in accordance with an example embodiment. In an embodiment, all video coding in the base and enhancement coding layers may be performed in the YCbCr 4:2:0 color space. Each of the EDR image encoder 100 and the EDR image decoder 105 may be implemented by one or more computing devices.

The EDR image encoder (100) is configured to receive a high-resolution (e.g., UHD) input EDR image (102). As used herein, an "input EDR image" refers to an enhanced or high dynamic range image data (e.g., raw image data captured by a high-end image acquisition device and the like) that may be used to derive an EDR version of the input image. The input EDR image 102 may be in any color space that supports a high dynamic range color gamut. In an embodiment, the input EDR image is a 16-bit YCbCr image, which may have been originally in the RGB space. As used herein, for an image with multiple color components (e.g., RGB or YCbCr), the term n-bit image (e.g., 12-bit or 8-bit image) denotes an image where each pixel of its color components is represented by an n-bit pixel. For example, in an 8-bit RGB image, each pixel comprises of three color components, each color component (e.g., R, G, or B) is represented by 8-bits, for a total of 24 bits per color pixel.

Each pixel may optionally and/or alternatively comprise up-sampled or down-sampled pixel values for one or more of the channels in the color space. It should be noted that in some embodiments, in addition to three primary colors such as red, green and blue, different primary colors may be concurrently used in a color space as described herein, for example, to support a wide color gamut; in those embodiments, image data as described herein includes additional pixel values for those different primary colors and may be concurrently processed by techniques as described herein.

EDR-to base layer quantizer (from now on to be referred to as Layer Decomposer, LD) 110 converts EDR input 102 to a BL image (112) of lower depth (e.g., an 8-bit image). An example of an LD process is described in PCT Application with Ser. Number PCT/US2012/062932 (the '932 application), filed on Nov. 1, 2012, titled "Layer decomposition in hierarchical VDR coding," by G-M. Su et al., incorporated herein by reference in its entirety. Depending on the bit-depth capabilities of BL Encoder 120, pixel values of BL signal 112 may be clipped (e.g., in the range (0.255) for 8-bit signals) by clipping process 115.

BL image encoder (120) is configured to encode/format the BL image (112) to generate a coded (or compressed) BL image 122. In some embodiments, the image data in the base layer image container is not for producing SDR images optimized for viewing on SDR displays; rather, the image data in the base layer image container is optimized to contain an optimal amount of base layer image data in a lower bit depth image container for the purpose of minimizing an overall bit requirement for the coded EDR image and to improve the overall quality of the final decoded image (197). BL encoder may be any of the known video encoders, such as those specified by the ISO/IEC MPEG-2, MPEG-4, part 2, H.264, or HEVC standards, or other encoders, such as Google's VP8, Microsoft's VC-1, and the like.

BL decoder (130) in the EDR image encoder (100) decodes the image data in the base layer image container into a decoded base layer image 135. Signal 135 represents the decoded BL as will be received by a compliant receiver. The decoded base layer image 135 is different from the BL image (112), as the decoded base layer image comprises coding changes, rounding errors and approximations introduced in the encoding and decoding operations performed by the BL encoder (120) and the BL decoder (130).

Predictor process 140 performs one or more operations relating to predicting EDR signal 102 based on the decoded BL stream 135 (or in some embodiments, the LDR signal 112 or the output of the clipping step 115). The predictor 140 attempts to implement the reverse of operations performed in the LD 110. Example embodiments of such a predictor are described in the '932 PCT application and in PCT Application with Ser. No. PCT/US2012/033,605, filed on Apr. 13, 2012, and titled "Multiple color channel multiple regression predictor," by G-M. Su et al., which is incorporated herein by reference in its entirety. The predictor output 142 is subtracted from the EDR input 102 to generate residual 152.

In some embodiments, the residual image 152 may be processed by clip mask process 155, which sets certain values of residual signal 152 to a fixed value. Let $v_i$, $s_i$, $\hat{v}_i$, and $r_i$ denote respectively the input EDR signal 102, the BL signal 112, the predicted EDR signal 142, and the residual signal 152. As noted earlier, if $s_i$ is larger than a predefined threshold $T_{BL}$ (e.g., $T_{BL}=255$ for 8-bit encoding), then during clipping 115 if $s_i > T_{BL}$, then $s_i = T_{BL}$. Given a second threshold $T_{EL}$ (e.g., $T_{EL}=250$ for 8-bit encoding), then during clip mask clipping 155 of the residual, if $s_i < T_{EL}$, then the corresponding residual value $r_i$ is set to a fixed value (e.g., if $s_i < T_{BL}$, then $r_i=0$), otherwise residual $r_i$ is coded in the enhancement layer coded stream. Hence, outside of a narrow range of quantized pixel values that are encoded at both layers (e.g., when $T_{EL} < s_i < T_{BL}$), the input stream values are coded in either the BL or the EL.

In an example embodiment, an enhancement layer quantizer (NLQ) 160 in the EDR image encoder (100) is configured to quantize the EDR residual values (152) from a high bit-depth digital representation (e.g., 16 bits) to a lower digital representation (e.g., 8-bits) using an NLQ function determined by one or more NLQ parameters. The NLQ function may be linear, piece-wise linear, or non-linear. Examples of non-linear NLQ designs are described in PCT application PCT/US2012/034747, "Non-linear VDR residual quantizer," filed Apr. 24, 2012, by G-M Su et al., which is incorporated herein by reference in its entirety.

In some embodiments NLQ 160 may be followed by a spatial resolution down-sampler (e.g., from a 4K resolution down to a 2K resolution). In some embodiments, down-sampler 165 may precede NLQ 160. After NLQ and down-sampling, clipping 167 guarantees that all residual values to be coded will be within the dynamic range supported by EL encoder 170 (e.g., (0, 255) for 8-bit encoders).

Enhancement layer (EL) encoder 170 is configured to encode the residual values in an enhancement layer image container to generate the coded EL stream 172. EL encoder 170 may be any of the known video encoders, such as those specified by the ISO/IEC MPEG-2, MPEG-4, part 2, H.264, or HEVC standards, or other encoders, such as Google's VP8, Microsoft's VC-1, and the like. EL and BL encoders may be different or they may be the same.

The set of parameters used in LD 110, the predictor 140, and NLQ 160 may be transmitted to a downstream device (e.g., the EDR image decoder 105) as a part of supplemental enhancement information (SEI) or other similar metadata carriages available in video bitstreams (e.g., in the enhancement layers) as metadata 142 and 162. As defined herein, the term "metadata" may relate to any auxiliary information that is transmitted as part of the coded bit-stream and assists a decoder to render a decoded image. Such metadata may include, but are not limited to, information as: color space or gamut information, dynamic range information, tone mapping information, or other predictor, up-scaling, and quantizer operators, such as those described herein.

After generating all parts of the layered EDR stream, the coded EL stream (172), the coded BL stream (122), and related metadata are multiplexed and packetized so that they can be stored in a storage medium and/or be transmitted to a decoder.

In some embodiments, BL signal 112 may be compressed at a lower spatial resolution (e.g., at 720p or 1080p) than the original resolution of the EDR input 102. Then, EDR signal 102 may be down-sampled before being encoded by BL encoder 120. Such down-sampling may be performed either before or after the LD process 110. In cases where the BL signal is down-sampled before BL encoding, it can be appropriately up-sampled before or after the prediction step 140 so that signals 102 and 142 have matching spatial resolutions.

FIG. 1B depicts a dual-layer EDR video decoder 105 according to an example embodiment. The decoder is configured to receive input video signals in multiple layers (or multiple bitstreams) comprising a base layer 122 and one or more enhancement layers (e.g., 172).

As depicted in FIG. 1B, BL decoder 180 is configured to generate, based on an input coded base layer video signal 122, a decoded base layer image 182. In some embodiments, BL decoder 180 may be the same, or substantially similar to, the BL decoder 130 in the EDR image encoder (100). BL decoded output 182 is passed to predictor (or inverse BL quantizer) 190 to generate an EDR estimate image 192. Predictor 190 may be the same or substantially similar to predictor 140. Predictor 190 may utilize input metadata 142 to extract needed prediction parameters.

An EL decoder 175, corresponding to the EL Encoder 170, is being used to decode received coded EL stream 172 to generate decoded quantized residual stream 176. The decoded stream 176 is passed to an inverse EL quantizer (NLdQ) 185 to generate residual 187. In some embodiments, if the original EL stream was down-sampled (165), the decoded EL stream 175 may be processed by a corresponding up-sampler 177 followed by a rounding or clipping process 179 so that up-sampled pixels do not exceed the input dynamic range of NLdQ. NLdQ 185 maps a low bit-depth residual (e.g., 8 bits) to a high bit-depth (e.g., 16 bits) residual 187, which is added to the predicted EDR stream 192 to generate a final decoded EDR signal 197, representing a close approximation of the original EDR signal 102. EDR signal 197 may also be post-processed by a display management (DM) process (e.g., see FIG. 2) to match the signal requirements for rendering on a suitable EDR display.

As depicted in FIG. 1B, received metadata 142 and 162, comprising quantization and prediction parameters computed by the EDR encoder 100, may also be used by predictor 190 and inverse quantizer 185 during the decoding process 105.

Multi-Format Distribution

In some embodiments, a media server may need to transmit EDR input 102 across a variety of transmission media to receivers with diverse support for coding formats, such as compression algorithm or standard, coding bit rate, and spatial resolution.

FIG. 1C depicts another embodiment for a system (100B) supporting such multi-format transmission of EDR video signals. As depicted in FIG. 1C, in addition to the original BL stream 122 (e.g., a 4K stream), coded at a first bit rate, a content provider may provide additional BL streams (e.g., 122B and 122C) at different bit rates and/or resolutions. BL Encoders 120B and 120C may be the same as BL Encoder 120 (e.g., based on HEVC) but compressing at different bit rates or they may be different encoders (e.g., based on H.264 or other compression schemes). Optional down-samplers (e.g., 125) may also create BL streams at lower resolutions than the main BL stream 122. All these BL streams (e.g., 122, 122B, and 122C) may be stored on the server sharing a common EL bitstream (172) and a single set of metadata (e.g., 142 and 162), thus saving considerable storage space on the media distribution servers. Given the transmission and coding-format requirements, encoder 100B will multiplex an output stream comprising: the coded EL stream 172, the metadata (142, 162) generated for coding the main BL stream (122), and either the main coded BL stream (122) or one of the supplementary coded BL streams (122B, 122C).

Figure 1D:
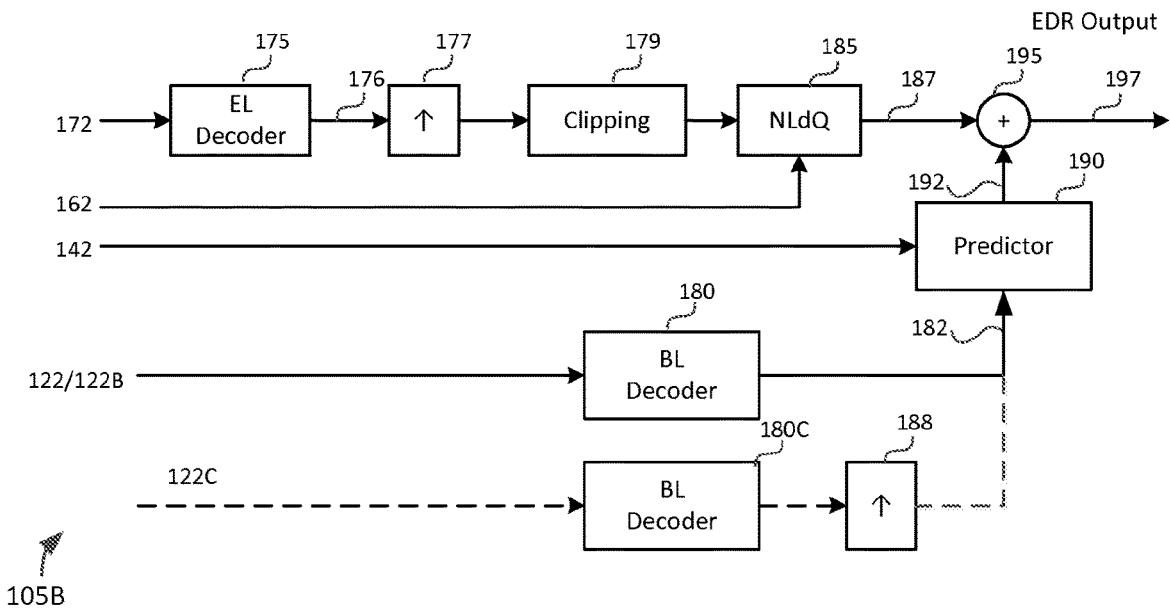

FIG. 1D depicts an embodiment for decoding multi-format EDR streams. Given input coded BL bit streams 122 or 122B, decoder 105B is identical to decoder 105 described earlier. Given the lower-resolution BL stream 122C, compared to decoder 105, decoder 105B comprises an additional up-sampler 188. Up-sampler 188 is used to compensate for the down-sampler (125) used in encoder 100B. BL decoder 180C corresponds also to BL encoder 120C.

Figure 1E:
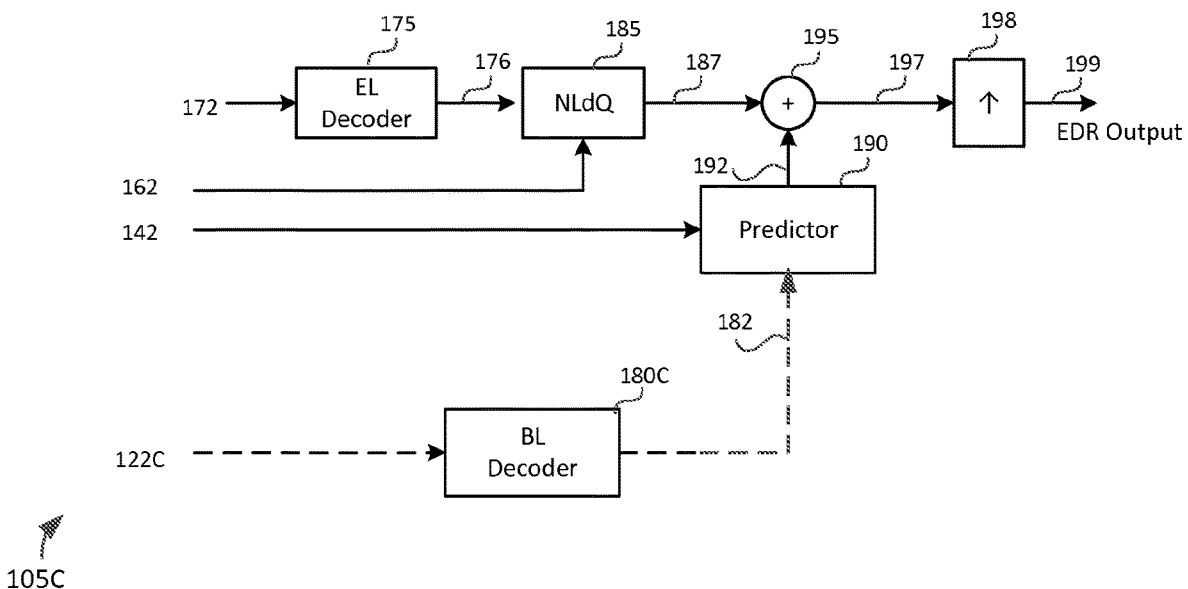

FIG. 1E depicts an alternative embodiment for decoding lower-resolution BL stream 122C (e.g., a 2K stream) when the resolution of the BL stream matches the spatial resolution of the compressed EL stream 172. In decoder 105C, the two up-samplers, 177 and 188 of decoder 105B, may be replaced by a single up-sampler 198 positioned after compositor 195.

Figure 1F:
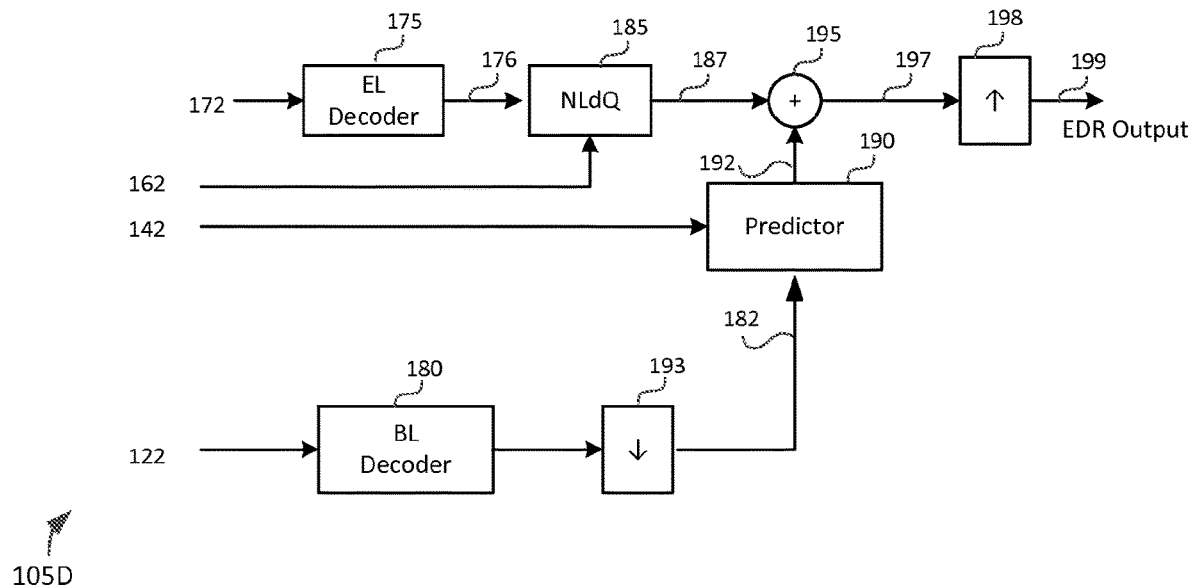
Figure 1G:
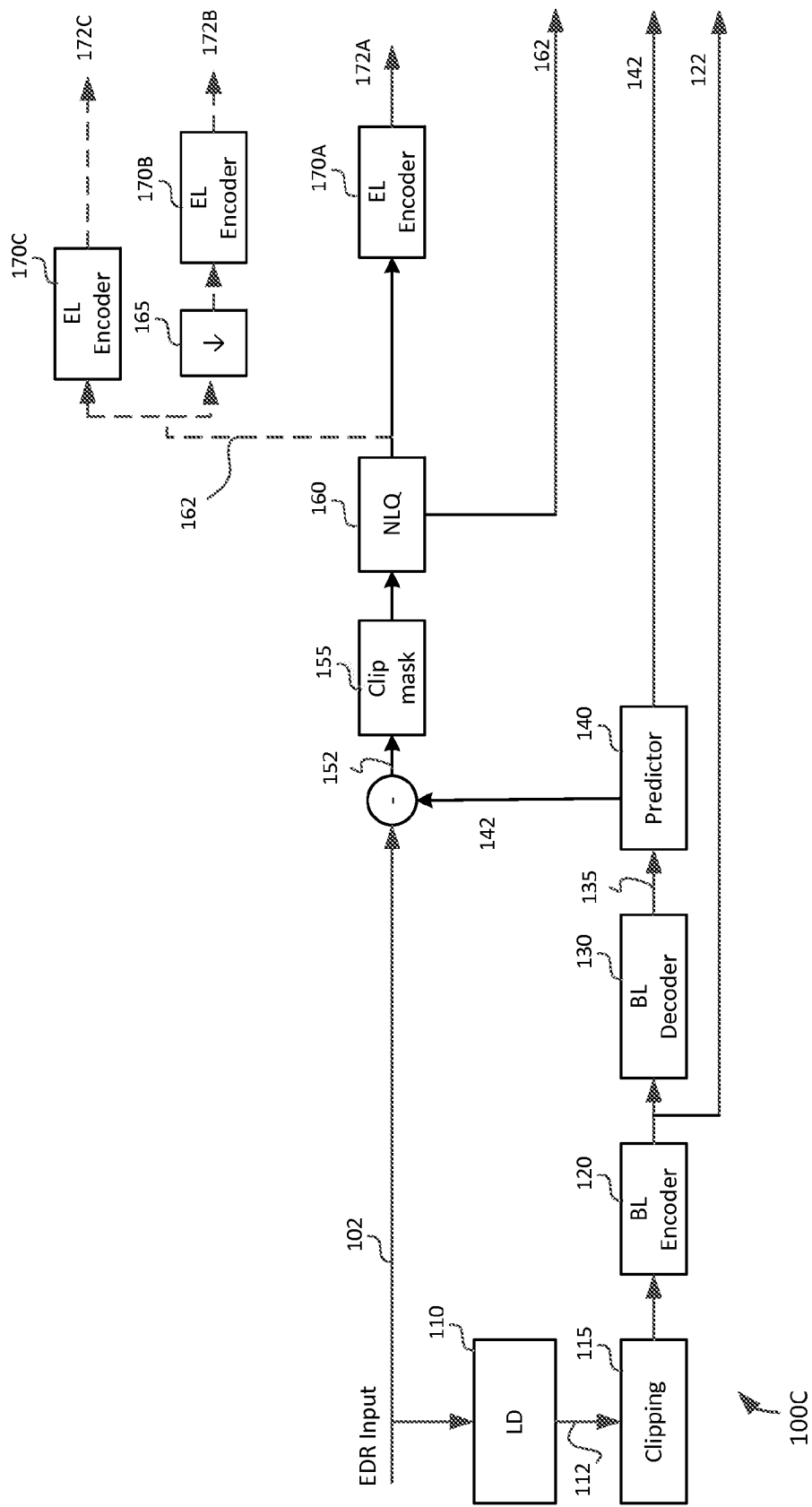

FIG. 1G depicts an alternative encoding embodiment (100C) where instead of using a single EL stream (172) and multiple BL streams, a server may use a single BL stream (122) and multiple EL streams (172A, 172B, and 172C). In such a configuration, after the EL quantization of the residual (160), the residual may be coded using a main EL encoder (170A) to generate a coded EL stream at a main coding format (172A), and one or more alternative encoders (170B, 170C) to generate coded EL streams in supplementary coding formats (172B, 172C). For example, EL Encoder 170C may be compressing signal 162 at a different bit rate or bit-depth than Encoder 170A, or using a different coding standard. Alternatively, EL encoder 170B may be encoding signal 162 at a different spatial resolution than EL encoder 170A. Given the transmission and coding-format requirements, an encoder will multiplex an output stream comprising: the coded BL stream 122, the metadata (142, 162) generated for coding the main BL stream (122) and the main coded EL stream, and either the main coded EL stream (172A) or one of the supplementary coded EL streams (172B, 172C).

Figure 1H:
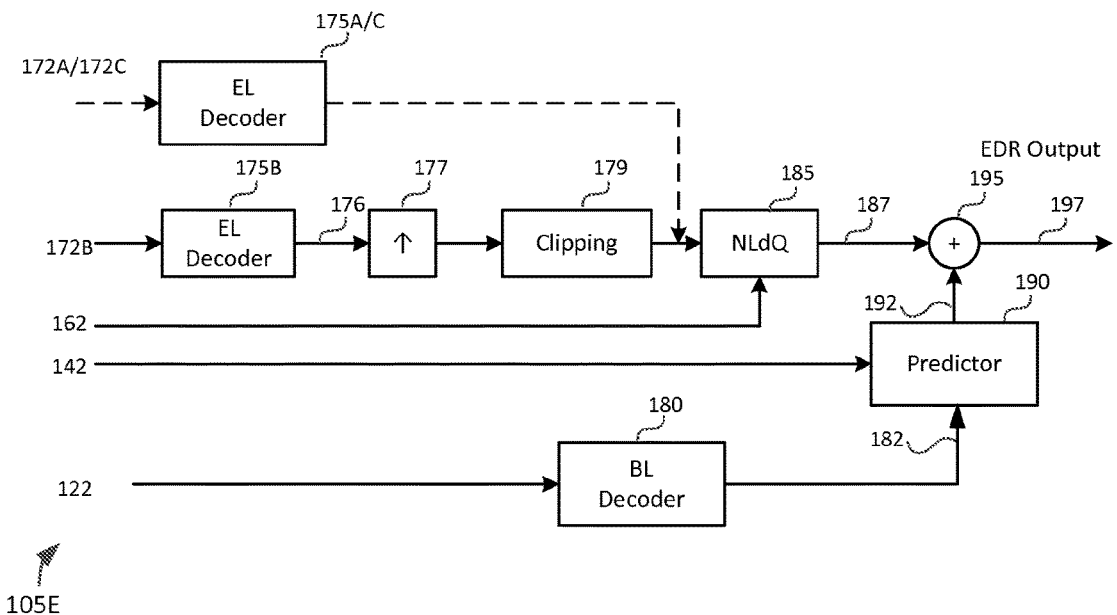

FIG. 1H depicts an example embodiment of a multi-format decoder (105E) adapted to receive and decode signals transmitted by multi-format encoder 100C. As depicted in 105E, the output of the EL decoder (175) may need to be up-sampled by an up-sampler (177), so that during the compositing process 195 the outputs of the predictor (192) and the inverse quantizer (187) have matching resolutions and color formats.

Computation-Scalable Decoding

In some decoders with hardware accelerators, it may be more computationally efficient to perform down-sampling or up-sampling on image data using these accelerators than to perform image prediction (190) and compositing (195) (or other operations) using a general purpose CPU at the full spatial resolution (e.g., 4K) of the incoming BL stream (122). FIG. 1F depicts an example embodiment of a decoding data flow that supports computation-scalable decoding.

As depicted in FIG. 1F, after BL decoding 180, its output is down-sampled by down-sampler 193. Down-sampler 193 may have the same down-sampling ratio (e.g., 2:1) as down-sampler 165 in the encoder 100, hence, compared to decoder 105, decoder 105D may not require up-sampler 177 and clipping process 179. In decoder 105D, prediction 190 and compositing 195, which may be performed by a general purpose CPU, are performed at a much lower spatial resolution, thus reducing the overall computation load on the CPU. After compositing 195, its output 197 is up-sampled (198) back to the full resolution to generate the EDR output 199.

Figure 2:
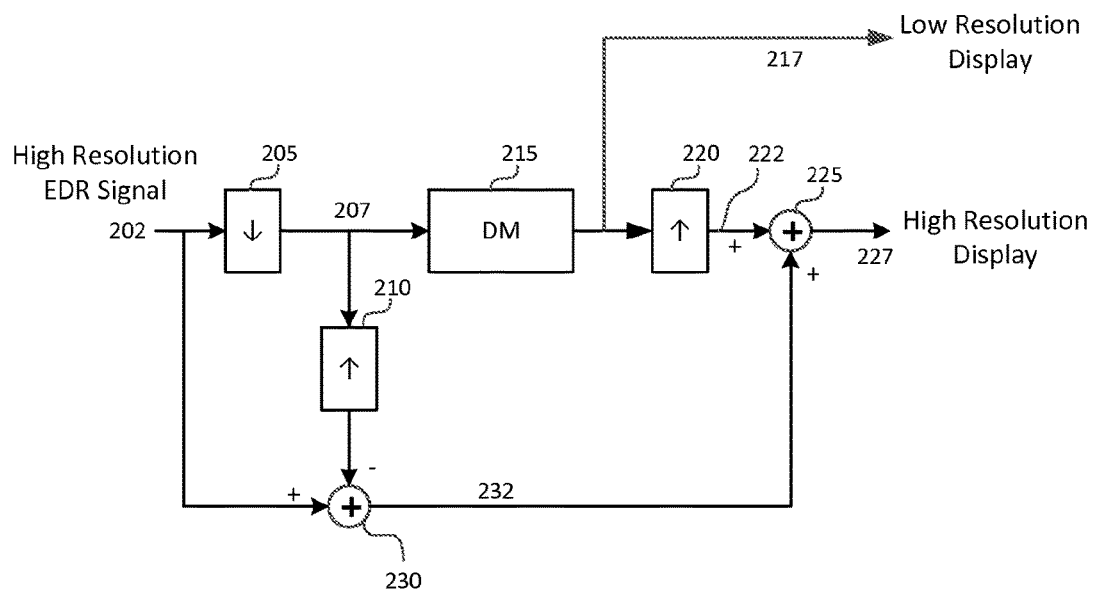
FIG. 2 depicts an example for a computation-scalable or resolution-scalable display management process for EDR images according to an embodiment of the present invention.

In some embodiments, in the decoder, after the EDR signal (197 or 199) is reconstructed, the signal may go through a display management (DM) process to map the dynamic range of the received EDR signal onto the dynamic range of a target display device. An example DM process for EDR signals is described in U.S. Provisional Application with Ser. No 61/767,380, "Display Management for High Dynamic Range Video," by R. Atkins, et al., filed on Feb. 21, 2013, which is incorporated herein by reference in its entirety. Due to the potential complexity of the DM process, legacy receivers may not be able to perform DM on full resolution pictures. Alternatively, a target display may also not support the full resolution of the received EDR signal. For example, the received signal may be an UHD (e.g., 4K) signal, but the signal may be displayed on an HD (e.g., 1080p) display or an UHD (e.g., 4K) display. FIG. 2 depicts an example embodiment for computation-scalable and/or resolution-scalable DM processing.

As depicted in FIG. 2, before the DM process 215, the received signal 202 is down-sampled (e.g., by a factor of two) using any known in the art of image processing down-sampling filters. In a parallel path, the down-sampled signal 207 is also up-sampled (210) back to the original resolution, and a residue signal (232) is generated. Residue signal 232 represents the error generated due to the down-sampling/up-sampling process. After DM process 215 is completed, DM output 217 is suitable to be displayed on a lower-resolution target display. Alternatively, DM output 217 may be up-sampled (220) to be displayed on a high-resolution display. To improve overall quality, residue signal 232 may be added back to the output of the up-sampler (222) to generate the final display-mapped signal 227 for the high-resolution display.

Reconfigurable Decoding

As mentioned earlier, bit rate or processing requirements may enforce an encoder (e.g., 100) to transmit the coded BL and EL streams at different resolutions. Consider, for example, the case where the coded base layer stream (122) comprises a 10-bit UHD stream (e.g., coded using HEVC), while the coded EL stream (172) comprises an 8-bit HD stream (e.g., coded using AVC). Now, consider also the case, that on the decoder, the target EDR display may only support HD resolutions. As depicted in FIG. 1B, for such a layered bitstream, an UHD EDR decoder (105), needs to up-sample (177) the decoded EL stream (176) before composing (195) the UHD EDR output (197); however, since the target display does not support UHD resolution, under such a scenario, an additional down-sampler is needed (not shown) to convert the UHD EDR signal (197) into an HD EDR signal. Ignoring the decoding and prediction requirements, such a scenario would require:

An 8-bit HD to UHD up-scaler (e.g., 177)
A 14-bit UHD to HD output down-scaler, and
An UHD composer (e.g., 195)

Figure 3:
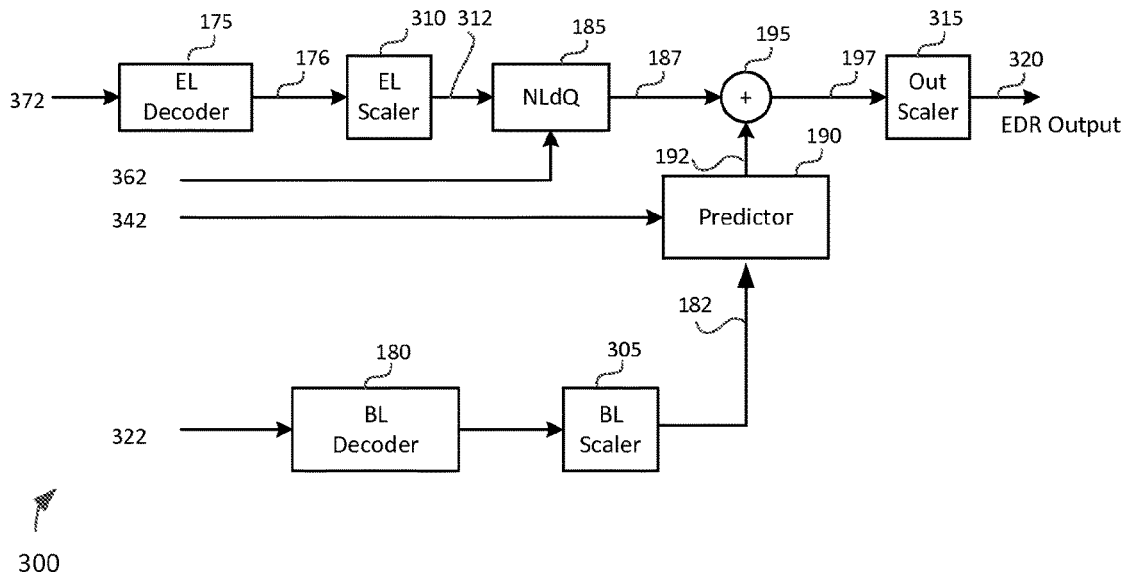
FIG. 3 depicts an example reconfigurable decoder system according to an embodiment of the present invention.

FIG. 3 depicts an example embodiment of a general purpose, re-configurable, EDR decoder (300) that may accommodate a variety of bitstream and target display resolutions. Comparing decoder (300) with previous decoding embodiments (e.g., 105 or 105*d*), in addition to the BL Decoder (180), EL Decoder (175), Predictor (190), Non-linear dequantizer (NLdQ 185), and Composer (195), decoder (300) may comprise BL Scaler (305), EL Scaler (310) and optional Output Scaler (315). In an embodiment, all scalers may operate in three modes: up-scaling to a target resolution, down-scaling to a target resolution, or no operation (NOP). Under the NOP mode, there is no scaling, that is, the scaler is bypassed and the output of the scaler has the same resolution as its input.

These Scalers may be implemented in software or in hardware using one or more processors. Scaling units may be distinct, that is, BL and EL scaling may be performed by distinct processors in parallel, or the scaling operations may be time multiplexed using a single processor.

Returning to our previous example, under the conditions where BL Stream resolution=UHD, EL Stream resolution=HD, and Target Display Resolution=HD, as explained before, in a traditional decoding implementation, the three scalers may be set as follows:

BL Scaler: NOP
EL Scaler: Up-sample from HD to UHD
Output Scaler: Down-sample from UHD to HD Since the resolution of the target display is known by the decoder, assuming the decoder knows beforehand the resolutions of the BL and EL streams (e.g., through metadata send by the encoder in streams 342 or 362), in a more efficient decoder, implementation of the Output scaling operation (315) may be moved and combined with the BL and EL Scaling operations to reduce processing power and/or hardware resources. For example, in a preferred embodiment, the three scalers may be set as follows:

BL Scaler: Down-sample from UHD to HD
EL Scaler: NOP
Output Scaler: NOP
Under this scenario, decoding requires:
An UHD to HD down-converter
An HD Composer which represents a significantly lower computation or hardware cost versus the traditional implementation described earlier, which required: an up-sampler, a down-sampler, and an UHD composer.

The method of taking into consideration the resolutions of: the target display, the original source, the BL stream, and the EL stream, in minimizing the number of scaling operations and for utilizing the composer at the smallest possible spatial resolution, may be extended to derive the optimum architecture for all possible scenarios. Example embodiments of a decision process for the optimum set-up of a re-configurable EDR decoder are depicted in FIG. 4A and FIG. 4B.

Figure 4A:
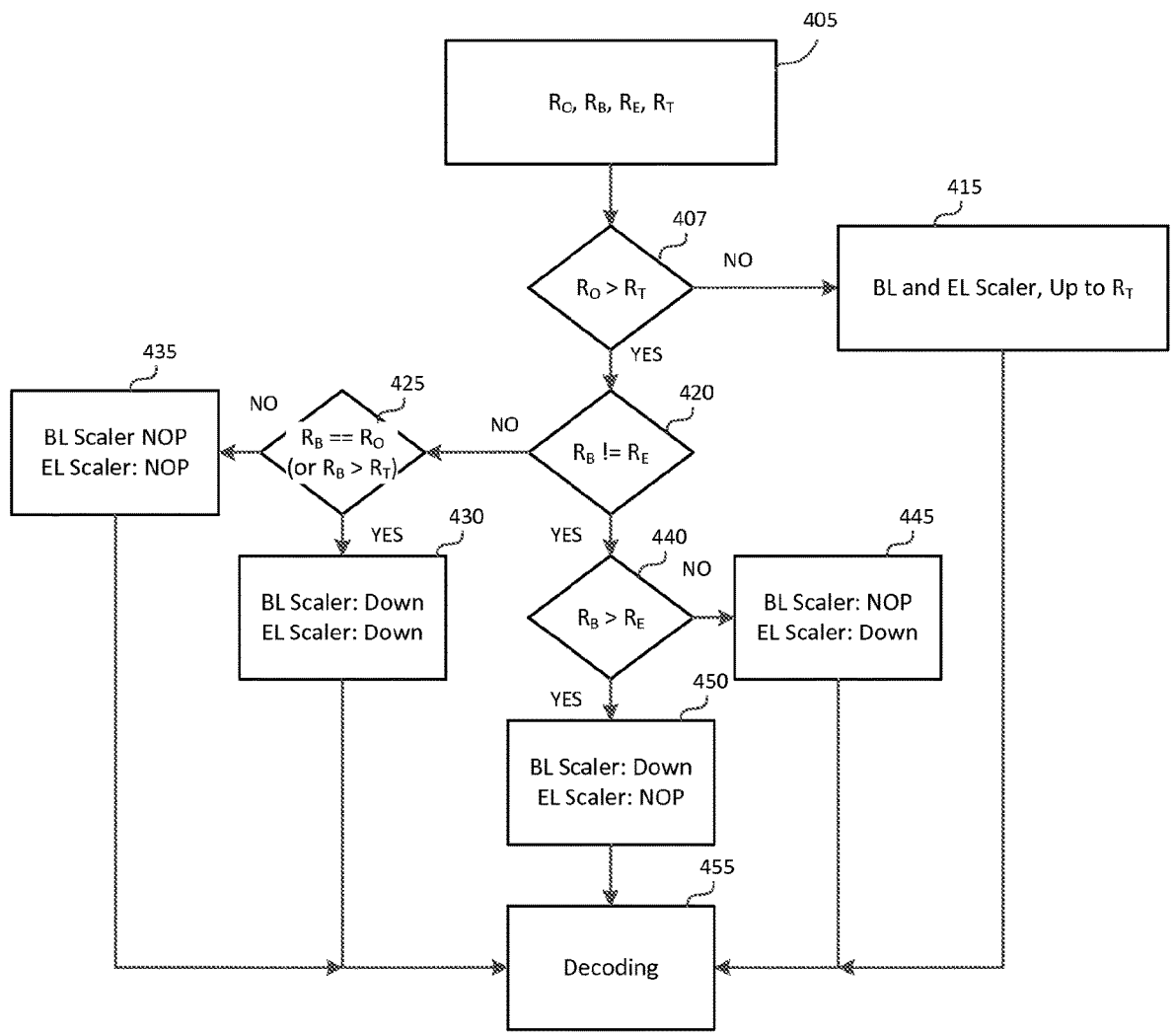
FIG. 4A and FIG. 4B depict two example decision processes for configuring Base layer and Enhancement layer scalers in a reconfigurable decoder system according to \embodiments of the present invention.
Figure 4B:
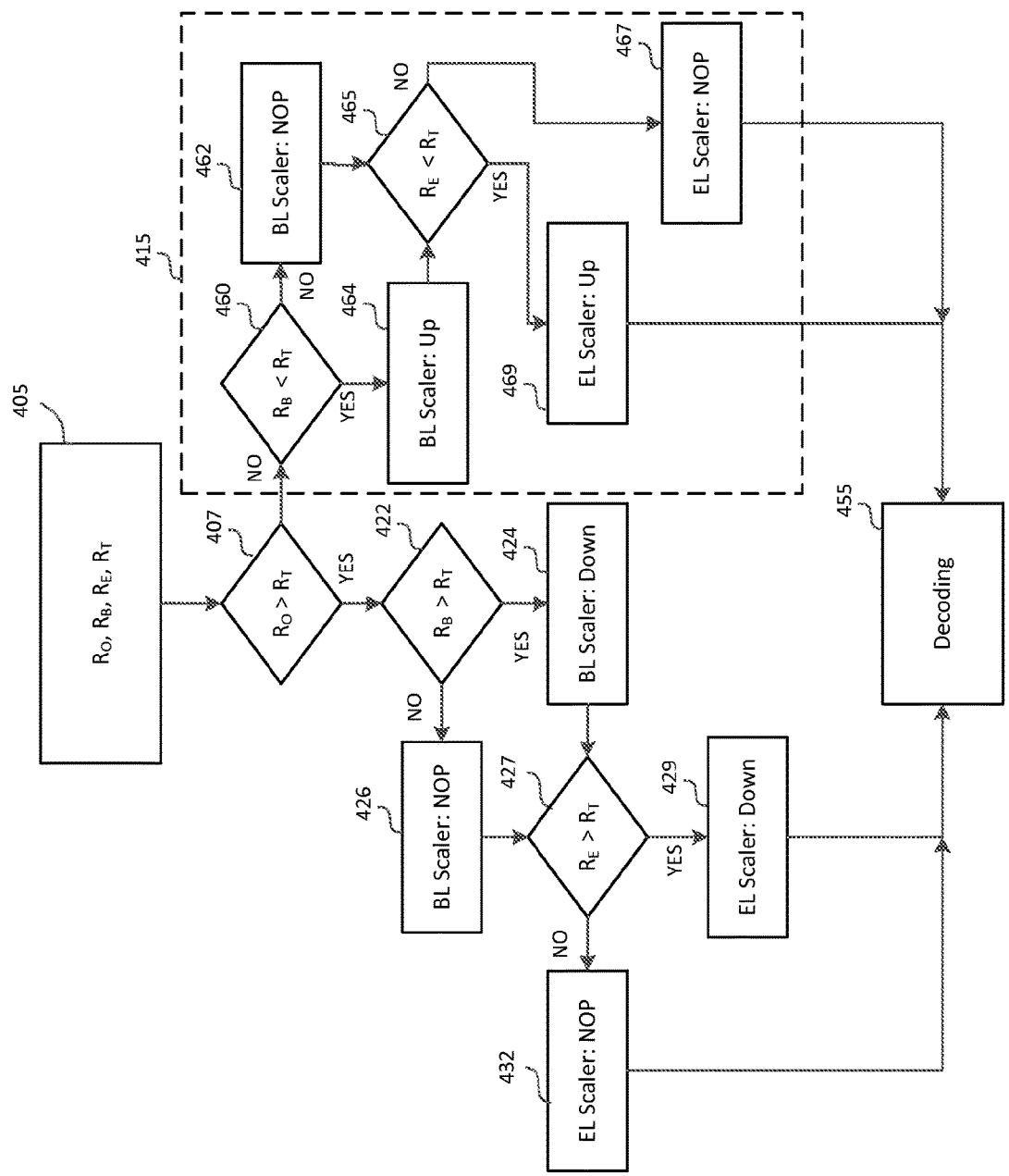

As depicted in FIG. 4A, in an embodiment, the BL and EL Scalers (305, 310) are configured according to the following resolution inputs (405): The resolution of the original EDR input source ($R_O$) (e.g., the resolution of EDR input (102) or EDR output (197)), the resolution of the target display ($R_T$), and the resolutions of the received BL and EL streams, denoted, respectively, as $R_B$ and $R_E$. As an example, each of these resolutions may be constrained to be UHD or HD; however, the methods are applicable to signals with any spatial resolution.

In step (407), a decision is made on whether the target resolution display is smaller than the default output resolution $R_O$ (e.g., the resolution of the input signal). If this not the case, that is, the target display resolution (e.g., UHD) is equal or larger than the video signal resolution (e.g., HD or UHD), then, in step (415), as needed, the BL and EL streams may be up-sampled to the target resolution. For example, if $R_O=R_T=$UHD, $R_B=$UHD, and $R_E=$HD, then EL Scaler is set to Up-sample to UHD and BL Scaler is set to NOP. The Output Scaler is always set to NOP. An example of an expanded version of step (415) is also depicted in FIG. 4B.

If $R_O>R_T$, then a second decision is made (420), whether the BL and EL streams have the same resolution. If yes, then a decision is made (425), whether their resolution matches the default video resolution ($R_O$), which is known to be higher than the target display resolution, or if their resolutions are larger than the target display resolution. If yes, (e.g., $R_B>R_T$ or $R_E>R_T$), then in step (430) both the BL and EL Scalers are set to down-sample from the input resolution to the target display resolution, otherwise, in step (435), both scalers are set to NOP. The Output Scaler is always set to NOP.

If $R_B$ and $R_E$ are different, then they are compared (440). If $R_B>R_E$, then in step (450), the BL Scaler is set to down-scale to HD, and the EL Scaler is set to NOP. If $R_B<R_E$, then in step (445), BL Scaler is set to NOP and EL Scaler is set to down-scale to HD.

In an another embodiment, if $R_O \le R_T$, the decision steps related to (420), (425), and (440), may also be replaced with the following decision tree:

if ($R_B>R_T$) BL Scaler: Down sample else BL Scaler: NOP if ($R_E>R_T$) EL Scaler: Down sample else EL Scaler: NOP An example implementation of such an embodiment is depicted in FIG. 4B. As understood by a person skilled in the art, other methods, similar to the methods above, may be applied to generate the same results. For example, in an embodiment, the order of decision steps may be different (e.g., one may check whether $R_E>R_T$ before checking whether $R_B>R_T$). Note that under the proposed reconfiguration, the Output Scaler is always set to NOP, thus, in most embodiments it can be eliminated. If any scaling is required to the decoder output signal (197), then it can be absorbed by the scaler of the target display.

Without limitation, as an example, if each of the four input resolutions (405) may take two possible values (e.g., UHD and HD), then there are 16 possible input configurations, which can be mapped into up to nine possible hardware configurations. Table 1, summarizes the recommended scaler set-up for eight cases of main interest, when $R_O=$UHD.

TABLE 1

BL and EL Scaler set-up when decoding an UHD EDR stream

| $R_B$ | $R_E$ | $R_T$ | BL Scaler | EL Scaler |
|---|---|---|---|---|
| HD | HD | HD | NOP | NOP |
| HD | UHD | HD | NOP | Downscale |
| UHD | HD | HD | Downscale | NOP |
| UHD | UHD | HD | Downscale | Downscale |
| HD | HD | UHD | Upscale | Upscale |
| HD | UHD | UHD | Upscale | NOP |
| UHD | HD | UHD | NOP | Upscale |
| UHD | UHD | UHD | NOP | NOP |

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to the layered encoding and decoding of multi-format images with enhanced dynamic range, such as those described herein. The computer and/or IC may compute any of a variety of parameters or values that relate to the layered encoding and decoding processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to layered encoding and decoding of multi-format EDR images as described above by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

Equivalents, Extensions, Alternatives and Miscellaneous

Example embodiments that relate to the efficient layered encoding and decoding of multi-format EDR images are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for encoding an enhanced dynamic range (EDR) image using multiple coding formats, the method comprising:
   receiving an input EDR image with a first spatial resolution;
   decomposing the input EDR image with a layer decomposer to generate a lower dynamic range (LDR) image;
   coding the LDR image with a first base layer (BL) encoder to generate a coded BL stream;
characterized by
   applying a prediction function with a predictor to the coded BL stream to generate a predicted EDR image;
   computing a residual image representing differences between pixel values in the predicted EDR image and the input EDR image;
   applying a clip mask to the residual image to generate a clip-mask image, wherein applying a clip mask comprises setting pixels values of the residual image to a predetermined fixed value if the corresponding pixel value of the LDR image is below a predetermined enhancement layer (EL) threshold;
   applying an EL quantizer to the clip-mask image to generate an EL image;
   coding the EL image with a first EL encoder using a first coding standard to generate a first coded EL stream;
   coding the EL image with a second EL encoder using a second coding standard different from the first coding standard to generate a second coded EL stream, wherein the second coded EL stream comprises at least one coding format parameter different than the coding format parameter of the first coded EL stream, the coding format parameter comprising a coding algorithm, a coding bit rate, or a spatial resolution of the coded bit stream;
   encoding and storing data representing the single coded BL stream, the prediction function, and the first coded EL stream and the second coded EL stream; and
   transmitting said data representing the coded BL stream, the prediction function, and, depending on the required coding-format, either the first coded EL stream or the second coded EL stream;
   wherein viewing the single coded BL stream consists of the single coded BL stream encoded with either the first coded EL stream or the second coded EL stream, and the single coded BL stream together with first coded EL stream is optimized for reconstructing high quality EDR images for viewing on EDR displays and the single coded BL stream together with second coded EL stream is optimized for reconstructing high quality EDR images for viewing on EDR displays.

2. The method of claim 1, further comprising down-sampling the EL image to generate a down-sampled EL image and generating the second coded EL stream based on the down-sampled EL image.

3. The method of claim 1, wherein the second coded EL stream is coded in a different bit rate than the first coded EL stream.

4. The method of claim 1, wherein the second coded EL stream is coded at a different spatial resolution than the first coded EL stream.

5. The method of claim 1, wherein the first EL encoder complies to a first coding algorithm and the second EL encoder complies to a second coding algorithm which is different than the first coding algorithm.

6. An apparatus for encoding an enhanced dynamic range (EDR) image using multiple coding formats, the apparatus comprising:
   an input to receive an input EDR image with a first spatial resolution;
   one or more processors to:
      decompose the input EDR image with a layer decomposer to generate a lower dynamic range (LDR) image;
      code the LDR image with a first base layer (BL) encoder to generate a first coded BL stream;
      apply a prediction function to the coded BL stream to generate a predicted EDR image;
      compute a residual image representing differences between pixel values in the predicted EDR image and the input EDR image;
      apply a clip mask to the residual image to generate a clip-mask image, wherein applying a clip mask comprises setting pixels values of the residual image to a predetermined fixed value if the corresponding pixel value of the LDR image is below a predetermined enhancement layer (EL) threshold;
      apply an EL quantizer to the clip-mask image to generate an EL image;
      code the EL image with a first EL encoder using a first coding standard to generate a first coded EL stream;
      code the EL image with a second EL encoder using a second coding standard different from the first coding standard to generate a second coded EL stream, wherein the second coded EL stream comprises at least one coding format parameter different than the coding format parameter of the first coded EL stream; and
   an output to generate data representing the coded BL stream, the prediction function, and either the first coded EL stream or the second coded EL stream;
   wherein viewing the single coded BL stream consists of the single coded BL stream encoded with either the first coded EL stream or the second coded EL stream, and the single coded BL stream together with first coded EL stream is optimized for reconstructing high quality EDR images for viewing on EDR displays and the single coded BL stream together with second coded EL stream is optimized for reconstructing high quality EDR images for viewing on EDR displays.

7. The apparatus of claim 6, wherein the one or more processors down-sample the EL image to generate a down-sampled EL image and generate the second coded EL stream based on the down-sampled EL image.

8. The apparatus of claim 6, wherein the coding format parameter comprises one or more of a coding algorithm, a coding bit rate, or a spatial resolution of the coded bitstream.

9. The apparatus of claim 6, wherein the second coded EL stream is coded in a different bit rate than the first coded EL stream.

10. The apparatus of claim 6, wherein the second coded EL stream is coded at a different spatial resolution than the first coded EL stream.

11. The apparatus of claim 6, wherein the first EL encoder complies to a first coding algorithm and the second EL encoder complies to a second coding algorithm which is different than the first coding algorithm.

12. The method of claim 2, further comprising:
   after the applying the EL quantizer and the down-sampling the EL image, clipping the down-sampled EL image such that all residual values to be coded are within a dynamic range supported by the second EL encoder.

\* \* \* \* \*